United States Patent [19]

Jones et al.

[11] Patent Number: 5,754,294
[45] Date of Patent: May 19, 1998

[54] OPTICAL MICROMETER FOR MEASURING THICKNESS OF TRANSPARENT WAFERS

[75] Inventors: Stephen H. Jones, Afton, Va.; Carolyn DeMain, Phoenix, Ariz.; Robert A. Ross, Charlottesville, Va.; David Abdallah, Auburn, N.Y.; Thomas Digges, Fredericksburg, Va.

[73] Assignee: Virginia Semiconductor, Inc., Fredericksburg, Va.

[21] Appl. No.: 643,169

[22] Filed: May 3, 1996

[51] Int. Cl.$^6$ ............................................. G01B 9/02
[52] U.S. Cl. ..................... 356/355; 356/357; 356/432; 356/381
[58] Field of Search ........................... 356/355, 357, 356/359, 360, 432, 433, 381

[56] References Cited

U.S. PATENT DOCUMENTS 4,773,760  9/1988  Makkonen ................... 356/381
4,984,894  1/1991  Kondo ........................ 356/357
5,403,433  4/1995  Morrison et al. ............ 356/381

*Primary Examiner*—Frank G. Font
*Assistant Examiner*—Robert Kim
*Attorney, Agent, or Firm*—Fish & Richardson P.C.

[57] ABSTRACT

Techniques and systems for measuring absolute thickness, the total thickness variation, and electric resistivity of a semiconductor wafer in a nondestructive optical fashion. Optical absorption is used to measure the absolute thickness of a semiconductor wafer with a light source and a phototransceiver. The thickness is determined by comparing the amount of absorption to a calibrated amount. Coherent light interference is used to measure the total thickness variation of a substrate. Alternatively, both the absolute thickness and total thickness variation of the substrate can be measured based on light absorption using a CCD imaging device. The resistivity of a wafer sample can also be measured by using an alternating electrical signal.

22 Claims, 6 Drawing Sheets

OPTICAL MICROMETER FOR MEASURING THICKNESS OF TRANSPARENT WAFERS

FIELD OF THE INVENTION

The present invention describes an optical micrometer. More specifically, an improved technique of characterizing aspects of semiconductor wafers is described which uses absorption and interference of optical beams, as well as attenuation of electrical signals.

BACKGROUND AND SUMMARY OF THE INVENTION

Microelectronic technology is the foundation for many revolutionizing technologies such as telecommunications, personal computing and communications, and modern medical instruments. Semiconductor wafers made of various semiconductor materials (e.g., Silicon and Gallium arsenide) form the backbone of the ever growing microelectronic industry. They are widely used for fabricating discrete electronic devices, integrated circuits, microelectromechanical devices and systems, and a variety of opto-microelectronic devices such as light-emitting-diodes and laser diodes.

Characterization of semiconductor wafers and processed substrates is an indispensable component of microelectronic technology. Better measuring, characterizing, and controlling substrate material properties can be used to improve the performance of the semiconductor devices and circuits. Hence, such test methods can have a significant impact on both the technical and economic aspects of the semiconductor manufacturing industry. Substrate characterization not only greatly facilitates research and development in new semiconductor wafer materials and devices, but also provides a critical tool in increasing the throughput of wafer inspection prior to shipping, providing needed information on wafer quality for improving manufacturing and application implementation.

One critical area of semiconductor characterization is substrate evaluation and specification in terms of substrate resistivity, substrate absolute thickness, and thickness uniformity across a substrate. This operation is essential to failure analysis and device performance. There has been continuous effort in developing various reliable and fast techniques of substrate characterization, particularly, those can work with ultra-thin wafers (e.g., 1 µm~100 µm in thickness) and most importantly, nondestructive measurement.

A number of techniques are known to measure important substrate parameters including the resistivity, absolute thickness, and thickness variation of a semiconductor substrate. However, many of these techniques include significant limitations. A majority of existing characterizing systems for semiconductor substrates is incapable of nondestructively measuring all three of these parameters simultaneously.

A mechanical micrometer is an example of a technique that uses probes to physically touch a wafer in order to measure the thickness. Touching can cause damage or scratches on the wafer that adversely affect the performance of a semiconductor device made from that wafer. Various nondestructive techniques, such as capacitance probes and sonar probes, have been developed to avoid this problem. However, these devices have significant limitations. Many of these devices are unable to measure thin wafers which have an absolute thickness less than 100 µm. In addition, calibration standards are typically required in the operation of these systems.

Several devices using optical methods (e.g., light reflection and interference) have been employed to measure dimensions of a workpiece. However, these devices are significantly limited relative to measuring thin wafers.

Furthermore, many of the conventional techniques for measuring wafer thickness cannot nondestructively and directly measure and view thin membrane windows etched into the wafer surface.

In recognition of the above, the present invention defines an optical-based technique of wafer characterization, an "optical micrometer". This optical micrometer uses optical beams to measure characteristics of semiconductor wafers. One preferred parameter is total thickness variation (TTV) of a semiconductor wafer sample. Another important feature is measurement of absolute thickness coupled with measurement of TTV. One embodiment of the present invention simultaneously measures resistivity, absolute thickness, and total thickness variation possible using an integrated characterization system.

In particular, the present invention is capable of viewing and measuring processed micro-structures such as membrane windows etched in thin silicon substrates. This system provides a fast, nondestructive, accurate, and operator-insensitive method for measuring a wide range of wafers with thickness ranging from sub-micron to about 1000 µm.

BRIEF DESCRIPTION OF THE DRAWINGS

These and other aspects of the invention will now be described in detail with reference to the drawings, in which.

DETAILED DESCRIPTION

Figure 1:
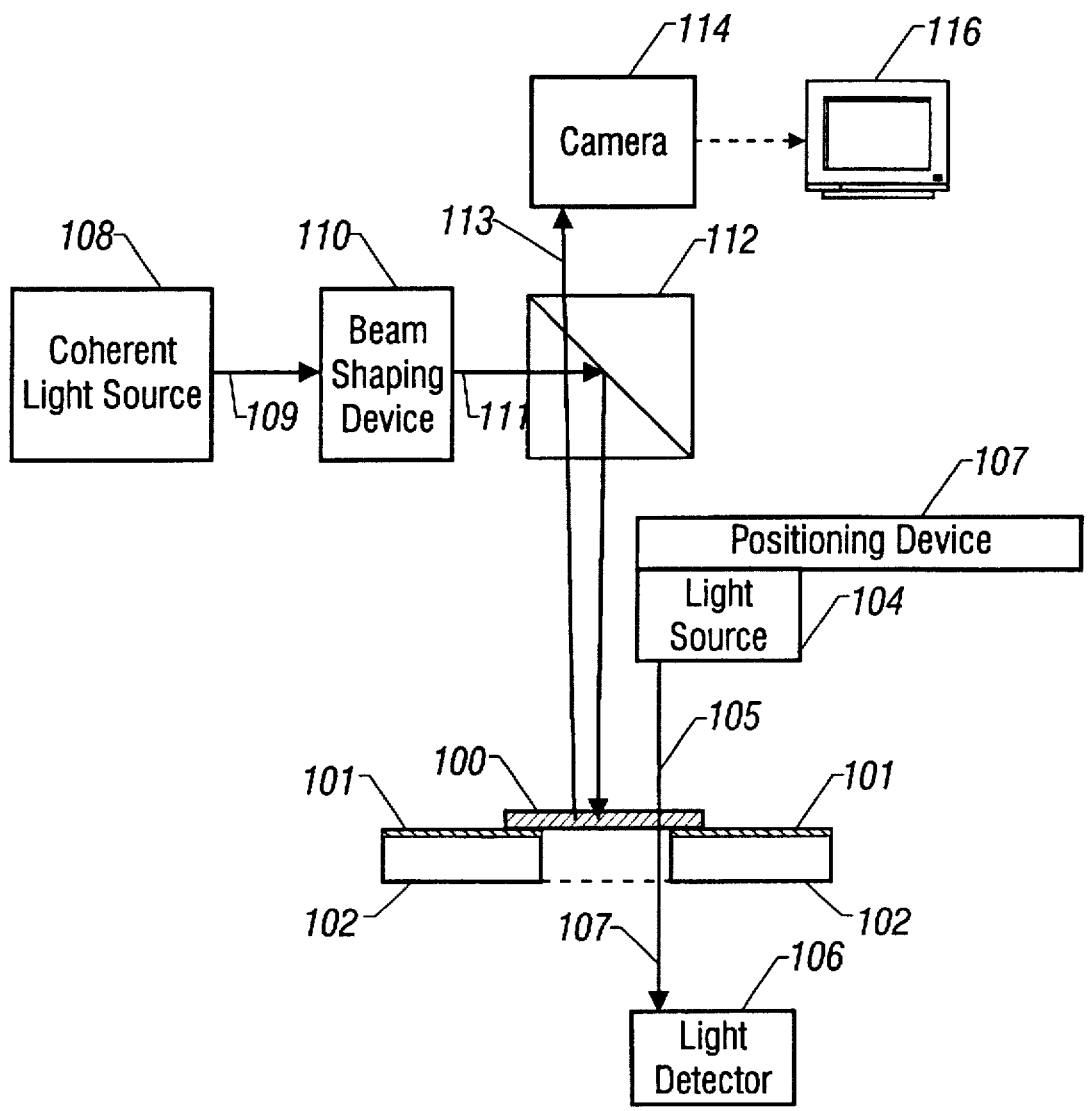
FIG. 1 is a schematic illustration showing a first embodiment of the optical micrometer utilizing both light absorption and interference.

FIG. 1 shows a block diagram of the first embodiment of the optical micrometer. A semiconductor wafer sample 100 is placed on a holding surface 101 of sample stage 102. Holding surface 101 on the sample stage 102 is formed of a Teflon-type of protective material to avoid damage to a surface of the sample 100. Sample stage 102 includes a through-hole 103 through which radiation can pass, to thereby allow exposure of both surfaces of the sample 100. Two light sources, 104 and 108, are used for measurement of absolute thickness at a specific point and mapping of total thickness variation, respectively. The light source 104 emits either coherent or incoherent nearly monochromatic light in the range from the visible to the infrared (IR) spectrum. The light source 104 can be, but is not limited to, either a combination of two or more laser diodes and/or light emitting diodes including beam shaping optics, a white light source (e.g., a Xenon lamp) with beam shaping optics and a set of narrow band optical filters at desired wavelengths. The beam 105 from the light source 104 is shaped as a narrow collimated beam incident to a selected point on the surface of the sample 100 at nearly normal incidence. A light detector 106 collects a portion of the beam 105 passing through the sample 100 and measures the optical intensity of the transmitted beam 107. The light detector 106 is capable of detecting photons within the spectral range of the light source 104 and can be a single detector or a combination of two or more detectors for different spectral range.

The coherent light source 108 generates a coherent light beam 109 for measurement of total thickness variation. The total thickness variation is calculated from an interference pattern that is produced by the coherent interference between the reflected beams from the top surface of the substrate and the reflected beams from the bottom surface.

The wavelength of the light source 108 is within at least partially transparent spectral range of the wafer sample 100. Some examples of light source 108 include a diode laser, a diode-pumped solid-state laser (including a fiber laser), and other lasers that can produce coherent radiation at desired wavelengths. A beam shaping device 110 transforms the light beam 109 into a collimated beam 111 with a broad cross-section. An optical beam splitter 112 directs a portion of the beam 111 to the wafer sample 100. A camera 114 that can detect photons at the wavelength of the light source 108 captures the intensity pattern in the reflected beam 113 from the wafer sample 100. A video display 116 is used for viewing the intensity pattern.

The semiconductor wafer sample 100 under measurement is preferably made of silicon, but can be made of any other material, including Gallium Arsenide, Indium phosphide and other similar materials. At least one of the two wafer surfaces is polished, and more preferably both surfaces are polished. The wafer sample 100 can also have thin film coatings (e.g., oxidation films).

Optical Micrometer of the embodiment in FIG. 1 utilizes two optical techniques in combination to obtain the desired data. Light absorption and interference are used together to perform the measurements. Since there is no physical contact with the wafer samples using the optical micrometer, the measurements are nondestructive. According to one aspect of the present invention, measurement of light absorption by wafer samples determines the absolute thickness at selected points, and light interference allows fast and accurate mapping of the total thickness variation across a wafer sample.

The absorption of the wafer sample 100 is detected at a selected point where the light beam 105 emitted by the light source 104 hits the substrate surface. The absorption is determined by a calibrated comparison between measured values of the detected intensity of the transmitted light beam 107 with and without the wafer sample 100 in place. The thickness at the corresponding point is proportional to the amount of light that passes. Hence, the thickness is determined by a calibrated look-up table technique. A set of pre-measured and calibrated data of absorption readings of the light detector 106 are prepared using wafer standards, i.e., a set of identically manufactured wafer samples having the same known characteristics with various values in thickness. The visible spectrum of the light source 104 is used to measure wafer samples which can be thinner than 1 µm and the IR spectrum of the light source 104 is used to measure samples of various values, e.g., up to 1000 µm or more in thickness.

The thickness variation of the entire wafer sample 100 is measured using a coherent light source 108 to generate interference patterns in the reflected beam 113 from the sample 100. A positioning device 107 is used to move the light source 104 out of the beam path between the optical beam splitter 112 and the wafer sample 100 during the measurements of interference patterns. The interference between the partially reflected beams from the two surfaces of the sample 100 produces dark and bright lines called "fringes" due to the coherence property of light. Each fringe represents the locus of points on the wafer sample 100 with equal thickness. Therefore, these fringes are related to the relative thickness variation of the wafer sample 100. The relative thickness variation between the centers of any two adjacent dark fringes (or any two adjacent bright fringes) is a constant.

This thickness variation constant can be accurately determined by first measuring the absolute thickness of two selected points located in the centers of two different dark fringes and then dividing the difference of the two measured thickness values by the total number of dark fringes from one selected point to another. Using the above two-step method, the absolute thickness of the wafer sample 100 at any location within the illuminated area by the beam 111 can be determined. The size of the cross-section of the beam 111 at the sample 100 determines the area that can be measured at one time. However, wafer samples that are larger than the cross-section of the beam 111 can also be measured. In that case, additional measurements are taken by moving the samples across the beam. A two-dimension translator using a stepping motor (not shown in FIG. 1) can be used for this translation. Such a translation setup for the sample stage 102 may be necessary also because the measurement procedure requires precise pointing of the collimated narrow light beam 105 from light source 104 toward a desired location (e.g., the center of a dark fringe).

One factor that affects the performance of the optical micrometer is the look-up table based on a set of pre-measured and calibrated data of absorption readings of the light detector 106 using wafer standards. The absolute thickness of wafer standards should cover the entire measuring range of the optical micrometer. The look-up table may be generated by the following three steps:

(1) Obtaining the average absolute thickness of wafer standards from measurements using several industrial standard techniques. One may choose, but is not limited to, such measuring techniques as spectrophotometer (e.g., Cary 5E UV-Vis-NIR), mechanical micrometers, capacitance probes (e.g., ADE Gage), sound wave detection (e.g. Sonogage 300) and others. The accuracy of optical micrometer can be improved by both using multiple measuring techniques and averaging the thickness values of a wafer standard obtained from different techniques.

(2) Calibration of the light source 104 and detector 106 with wafer standards. This is accomplished by an optical transmit and receive system used in the present invention shown in FIG. 1. By placing a wafer standard on the sample stage 102, one can obtain the output reading from the detector 106 corresponding to a specific thickness. The output reading is for a chosen wavelength in either the visible spectrum or the IR spectrum (e.g., red light near 680 nm or IR light near 910 nm). Using fitting techniques (e.g., least square fit), the measured data can be represented by a polynomial formula for a chosen wavelength within a limited range of thickness (e.g., red near 680 nm may be used for calibration for thickness from 1 µm to 150 µm and IR near 910 nm for 150 µm to 600 µm). The polynomial formula fitted to the measured data with the minimum standard deviation is used to generate a calibration curve of readings of the detector 106 versus the thickness for a chosen wavelength. Two or more such polynomial formulae and the corresponding calibration curves at different wavelengths are obtained in order to cover the entire measuring range of the optical micrometer.

(3) A calibration lookup table containing detector output readings versus thickness values is thus produced by using these fitting polynomial formulae and calibration curves at different wavelengths.

Figure 2:
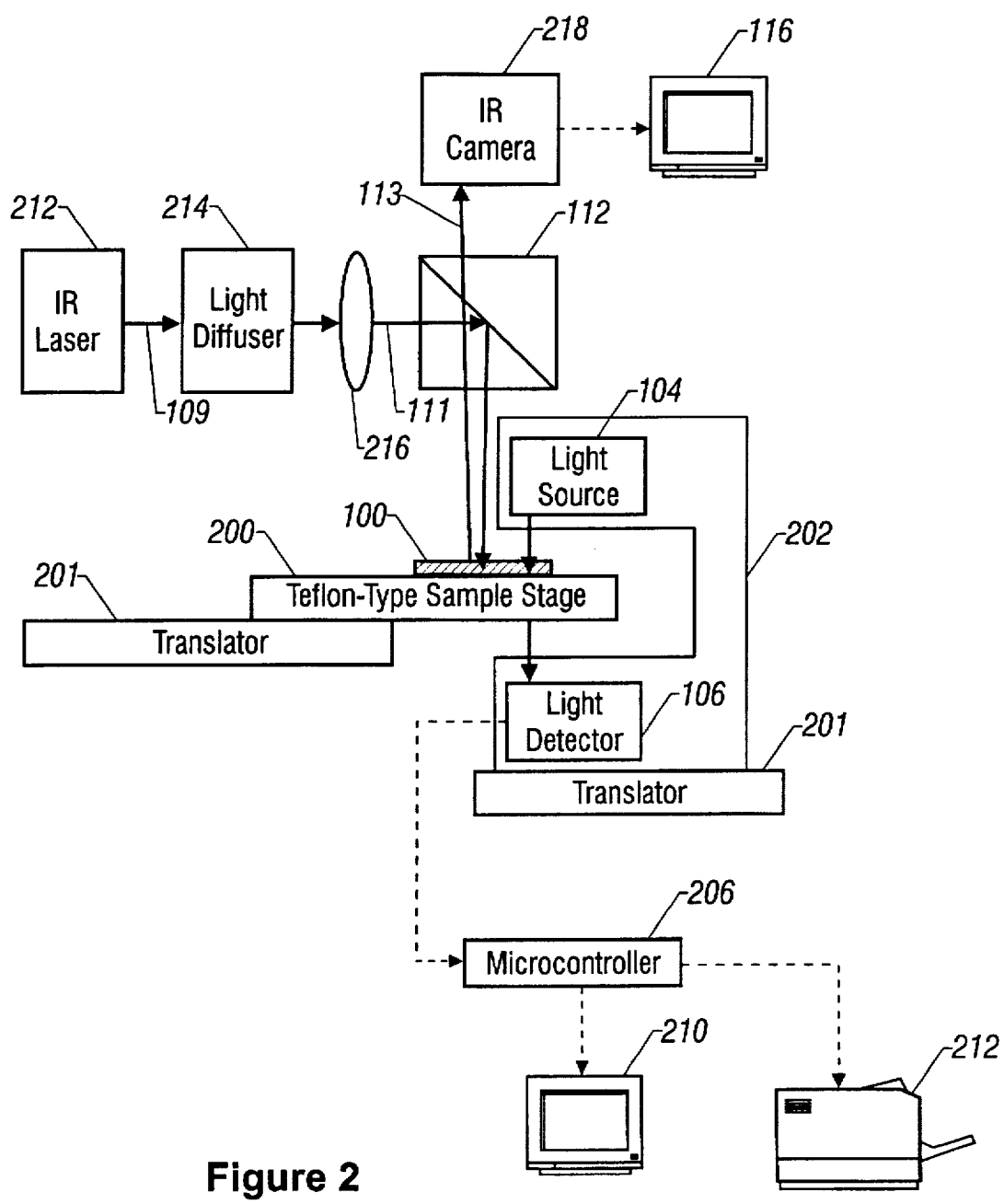
FIG. 2 is the second embodiment of optical micrometer utilizing both light absorption and interference and incorporating a microcontroller for absorption measurements.

FIG. 2 shows the second embodiment of the optical micrometer. The sample stage 200 is made of a Teflon-type of material to protect wafer samples from damage. A two-dimension translator 201 attached to the sample stage 200 allows precise positioning of the wafer sample 100. The light source 104 for absolute thickness measurements and the light detector 106 are permanently attached to an U-shaped structure 202 to ensure the optical alignment. The U-shape structure 202 is moved around the sample stage 200 by a translator 201. The light source 104 and light detectors 106 can be, but are not limited to, a compact light-detector system. One example of such system is that the light source 104 has two light-emitting-diodes, one emitting red light near 680 nm and the other one emitting IR light near 910 nm. The detectors 106 are a pair of phototransceivers for 680 nm and 910 nm, respectively. An IR laser 212 (e.g., a diode laser at 1.3 µm) is used as the coherent light source for measuring total thickness variation. A light diffuser 214 and a positive lens 216 are used to produce an uniform and collimated beam with a broad cross-section (e.g., 2" in diameter). An IR viewing camera 218 captures the image of the reflected light from the sample 100 and feeds that image to a video display 116 for viewing. A microcontroller 206 carries out data processing and system monitoring. Measurement results and parameters of the system status are sent to a video display 210 and a printer 212.

The microcontroller 206 has several functions in data processing and system controlling. It converts the analog output in voltages from the detector 106 into digital form and automatically calculates the thickness values based the calibration curve described previously. The final thickness measurements are shown on the video display 210. The microcontroller 206 ensures the light source 104 and detector 106 on the U-shape structure 202 are in the correct position for both self-calibration and thickness measurements by a triggering mechanism based on the position of the U-shape structure 202. Wafer movement and other noise is also compensated by analyzing several consecutive data points (e.g., three data points) to ensure consistency within a pre-set precision range.

If all the data points in one sampling (e.g., measuring three consecutive data points) meet the precision requirement, their averaged value is further processed. Otherwise, the data points are rejected. Thus, the possibility of reporting inaccurate results due to wafer movement and background noises is minimized. In addition, the microcontroller 206 monitors the environmental temperature due to the temperature sensitivity inherent with infrared detectors. If the temperature falls out of the accepted range, a warning message appears on the display 210 and the measurement suspends until the system returns to the normal operating temperature range.

Figure 3:
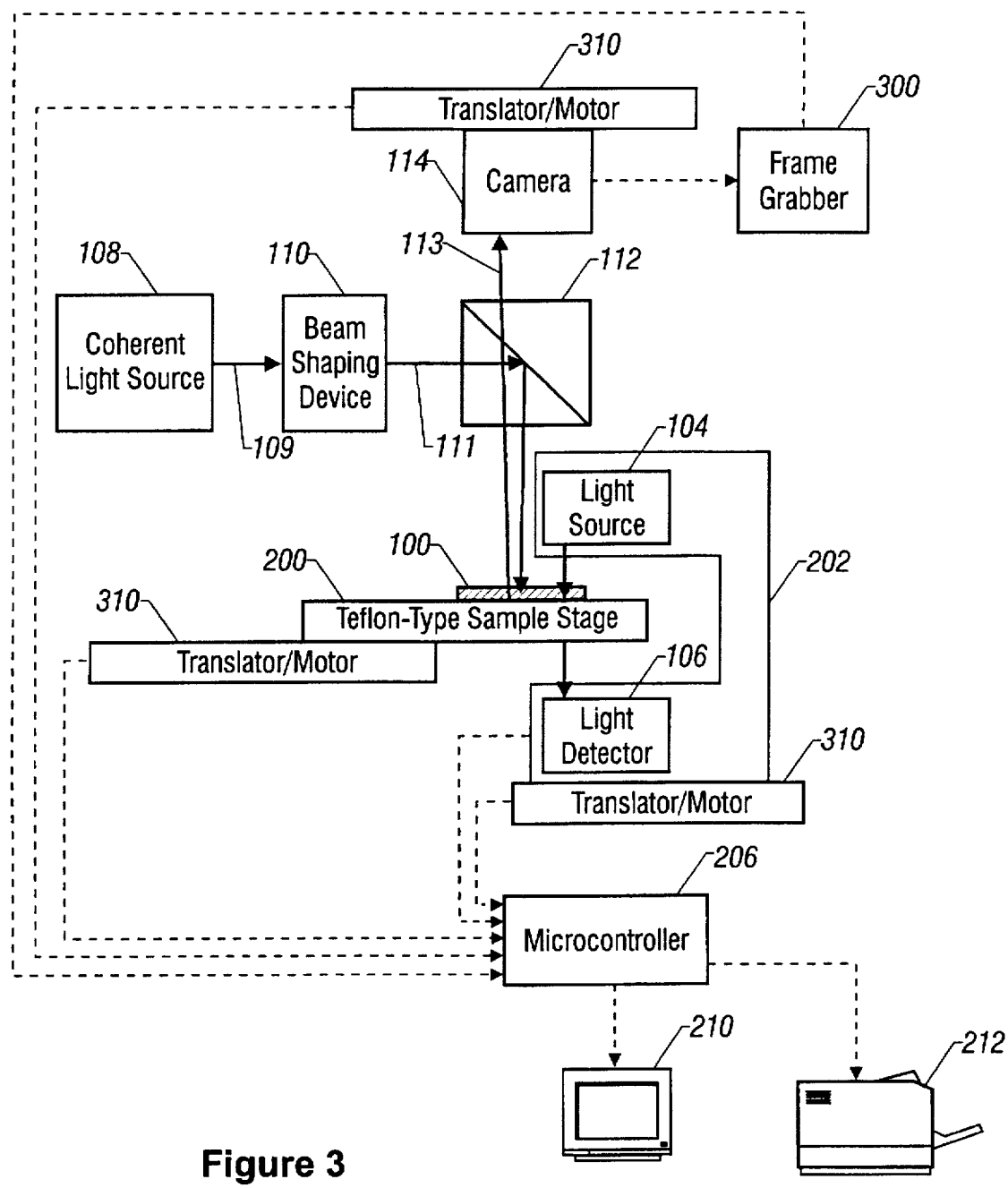
FIG. 3 is the third embodiment of optical micrometer utilizing both light absorption and interference and incorporating a frame grabber and a microcontroller for fully automated data processing and system control.

The third embodiment for the optical micrometer is shown in FIG. 3. This system enhances the automatic operation using a frame grabber 300 that is incorporated into the system of optical micrometer. For position registration and precise positioning, motor-driven 2-dimensional translators 310 are used with the camera 114, the sample stage 200, and the U-shaped structure 202 that holds the light source 104 and light detector 106. The microcontroller 206 controls the positioning of translators 310. This enables microcontroller 206 to determine the exact position of any selected points on the sample 100 with respect to a reference. The frame grabber 300 captures a frame that includes the intensity pattern of the reflected beam 113 from the wafer sample 100. The information indicating the intensity pattern along with corresponding position registration in digital form is fed to the microcontroller 206. To determine the absolute thickness, it is necessary to measure the thickness variation constant of any two adjacent dark fringes (or bright fringes) using absorption measurements. One method of doing so is described previously. A combination of position registration, the thickness variation constant of any two adjacent dark fringes, and the interference fringes captured by the frame grabber 300 allows the microcontroller 206 to produce a total thickness variation of the wafer sample 100. Equipped with a properly programmed microprocessor built into the microcontroller 206, the optical micrometer is able to perform the entire data processing (both absorption measurement and interference fringe measurement), automatic system calibration and monitoring with user-friendly interface.

Figure 4:
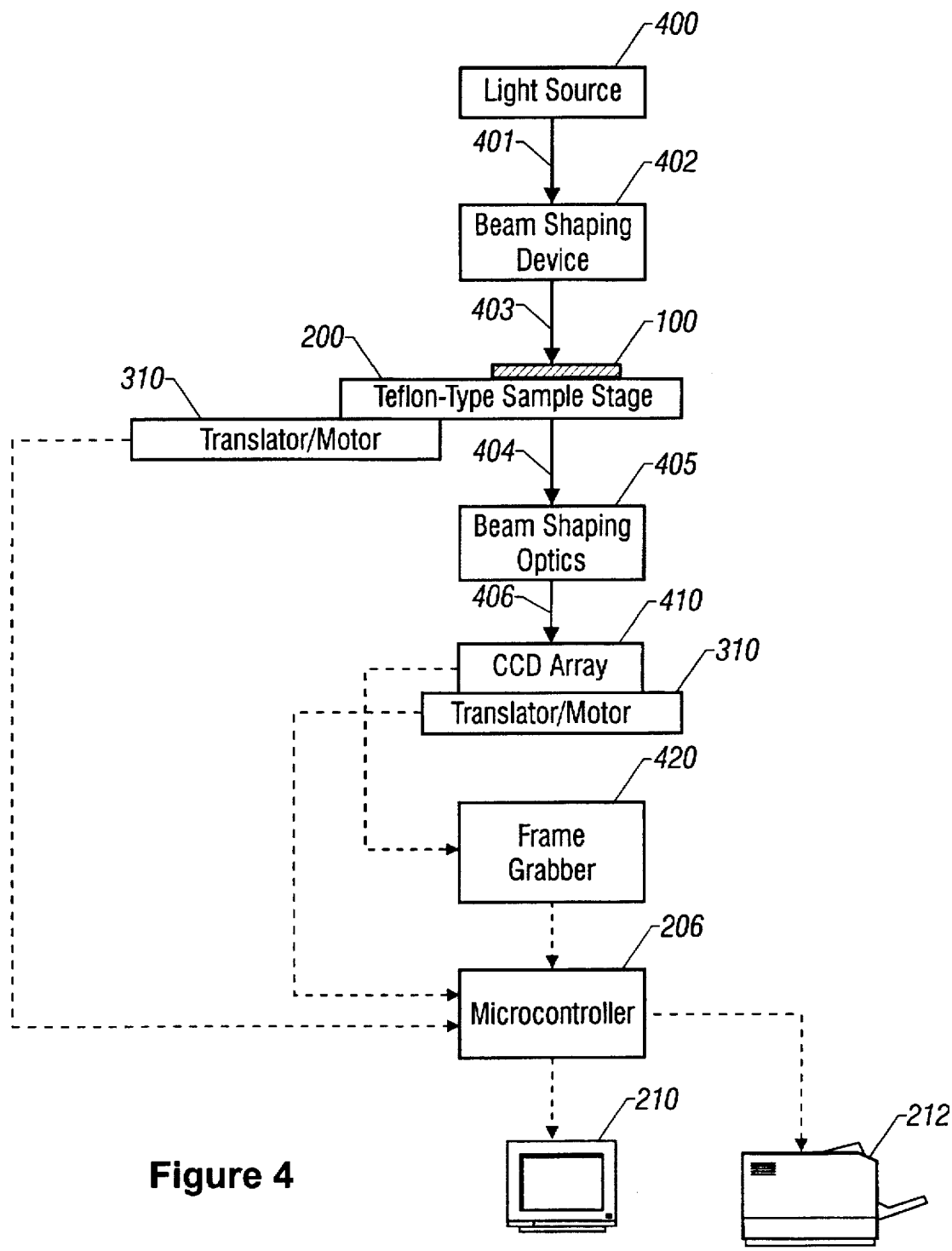
FIG. 4 is the fourth embodiment of optical micrometer based on light absorption utilizing a frame grabber and a microcontroller for fully automated data processing and system control.

The fourth embodiment of the optical micrometer, is a "direct imaging optical micrometer", as illustrated in FIG. 4. In this embodiment, only the light absorption is utilized for measurements, but the information extracted from the absorption is used for both absolute thickness and total thickness variation (TTV) measurement. A nearly monochromatic beam 401 from a light source 400 is transformed into an uniformly illuminated and well-collimated beam 403 with a broad cross-section by a beam shaping device 402. The wavelength of the output beam 401 should be within the spectral response range of CCD array 410. Coherence is not required for the light source 400 therefore a variety of light sources can be used, such as light-emitting-diodes, diode-based lasers, or a white-light source with proper narrow band optical filters. The beam 403 passes the wafer sample 100 placed on a sample stage 200. The CCD array 410 captures the intensity variation of the transmitted beam 404 pixel by pixel; essentially, the thickness of a small area on the wafer sample 100 corresponding to one pixel of the CCD array 410 is measured. The output from the CCD array 410 is fed to a frame grabber 420 and subsequently to a microcontroller 206. The intensity variation of the beam 404 is directly related to the thickness variation of the wafer sample 100 and the degree of intensity attenuation of the beam 404 with reference to the intensity of the beam 403 at one CCD pixel is directly related to the absolute thickness of a small area on the wafer sample 100 that is directly imaged by the pixel on the CCD array 410. Therefore, the readout from the CCD array 410 is a direct pixel-by-pixel mapping of the thickness variation of the sample 100 within the area illuminated by the beam 403.

The positions of the wafer sample 100 and the CCD array 410 should be registered with respect to a predetermined reference by using motor-driven positioning translators 310 that are controlled by the microcontroller 206. The absorption readout of each pixel of the CCD array 410 is the difference between the detected signal with the sample 100 in position (i.e., the sample 100 is in the path of the beam 403) and the detected signal with the sample 100 out of the position (i.e., the sample 100 is out of the path of the beam 403).

A similar technique to the calibration procedure discussed previously can be used to obtain the fitting polynomial formula and generate the calibration curve with wafer standards for absolute thickness. The CCD array 410 and the light source 400 combined with the beam shaping device 402 need to be calibrated with wafer standards. A series of data of the signal output from each CCD pixel versus the absolute thickness is obtained. Well-known polynomial formula curve fitting techniques can be used to fit the data with a minimum standard deviation. The results of the polynomial fitting curve is programmed into the microcontroller 206 for automatic data processing. The optical micrometer of FIG. 4 uses the CCD array 410 to directly image the thickness variation pixel-by-pixel. For a wafer sample larger than the cross-section of the beam 403 and the aperture of the CCD array 410, the sample 100 and the sample stage 102 can be repositioned to move the unmeasured area into the beam 403 so the thickness variation of the entire sample can be obtained.

Figure 5:
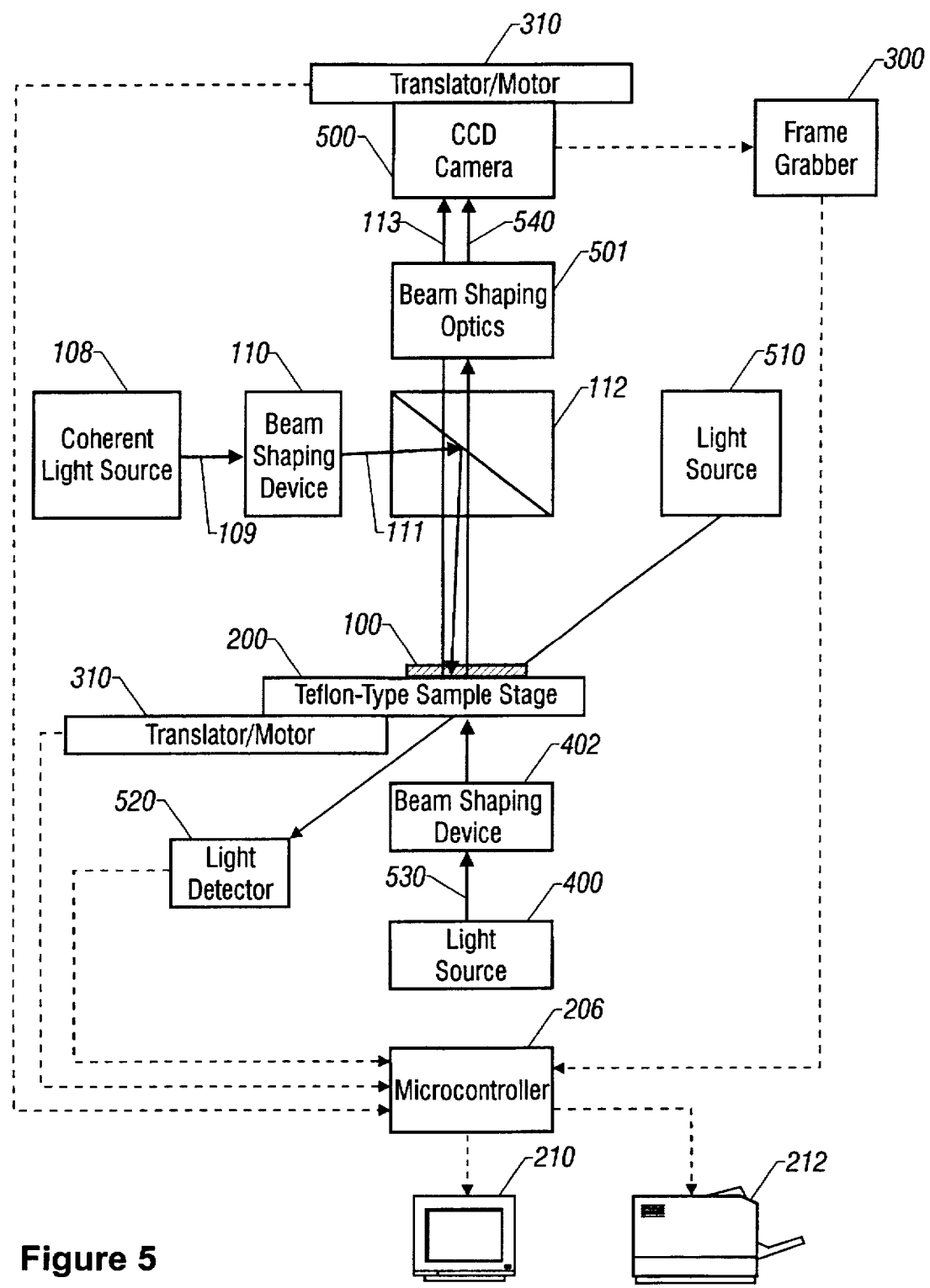
FIG. 5 illustrates an optical micrometer incorporating light absorption, light interference, and direct imaging technique to measure wafers with etched membrane windows.

The fifth embodiment of the invention shown in FIG. 5 combines many of the techniques used in the both the third and the fourth embodiments, thereby providing an enhanced optical micrometer with many improved functions. A CCD camera 500 can respond to the light from the coherent light source 108 and the light source 400 with sufficient detection efficiency. Beam shaping optics 501 is placed in the optical path of the CCD camera 500 to ensure undistorted imaging of both the beam 113 and the beam 540 from the wafer sample 100 that is to be characterized. The light source 510, emits either coherent or incoherent nearly monochromatic light in the range from the visible to the infrared spectrum, produces a well-collimated output beam with small divergence. This allows the light source 510 to be further separated from light detector 520 that measures the intensity of light from 510. Even though the light source 510 and the light detector 520 are further apart from each other, the entire beam produced by the light source 510 at the detector 520 falls within the active detection area of the detector 520. As a result, the light source 510 and the light detector 520 can be placed out of the path between the CCD camera 500 and the light source 400 in order to carry out all three measurements simultaneously.

The preferred choices for the light source 510 are a laser or a combination of a plurality of lasers. However, other light sources in combination with beam shaping devices can also be used if they can meet the above stated requirements for the light source 520. The light detector 520 should have sufficient detection efficiency within the emitting spectral range of the light source 510.

The light source 510 and the detector 520 can be attached to motor-driven, two-dimension translators that are controlled by the microcontroller 206. This allows the position registration and automatic optical alignment for detection calibration.

The present embodiment shown in FIG. 5, allows a user to choose different methods to characterize the wafer sample 100 based on the specific requirements of a measurement. The absolute thickness of the wafer sample 100 can be measured using either direct CCD imaging with the light source 400 and the CCD camera 500 as described in the fourth embodiment, or absorption measurements with the light source 510 and the detector 520 as described in the second and third embodiments. The total thickness variation can also be measured with two methods, interference technique using the coherent light source 108 and the CCD camera 500 as described in the third embodiment and direct CCD imaging with the light source 400 and the CCD camera 500 as described in the fourth embodiment.

In the case of measuring wafers with localized etched membrane windows, the present embodiment allows the CCD imaging system to be used to determine the absolute thickness and the total thickness variation of the membranes etched on the wafer sample 100 while the interference TTV system is used to determine the substrate region surrounding the membranes on the wafer sample 100.

An additional enhancement describes a subsystem allowing measurement of the electric resistivity can be integrated as an additional aspect to the optical micrometer of any of the preceding embodiments. This is described as follows.

Fundamental physics dictates that electric resistivity of a material may be determined if the geometrical dimension of the piece and the electric resistance across two different locations on the piece are known. A subsystem for measuring electric resistivity of wafer samples in the present invention utilizes two electric probes, a radio-frequency signal generator, a circuitry, and the thickness value measured by the optical measurements to determine the resistivity of a wafer sample.

Figure 6:
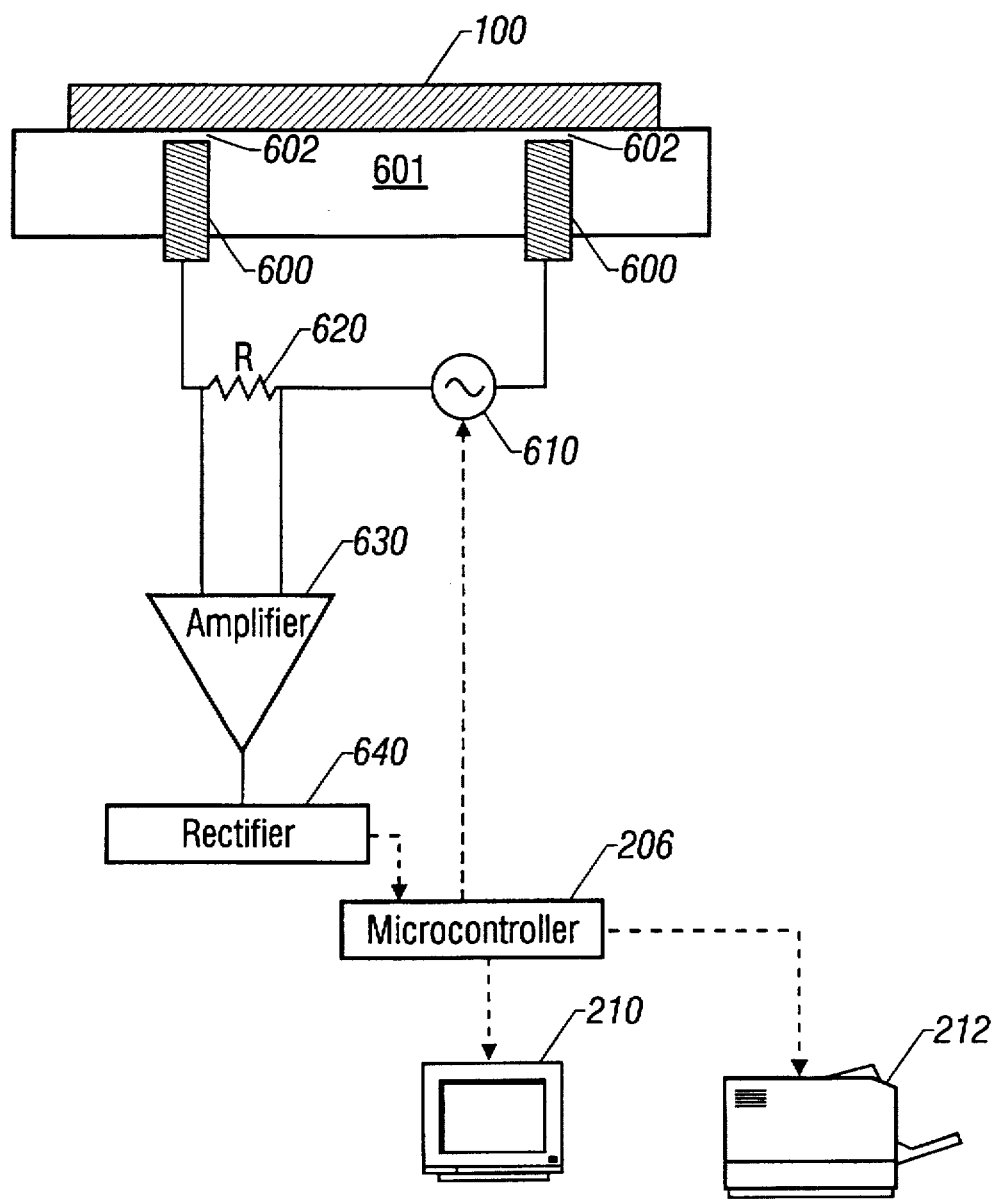
FIG. 6 shows an example of the subsystem for measuring wafer electric resistivity with a radio-frequency source that is integrated into optical micrometer.

FIG. 6 shows one embodiment of such a subsystem. Two identical conducting metal probes 600 (e.g., of copper) are embedded in a sample stage 601 made of Teflon-type materials to protect the wafer surface. The probes 600 and the sample 100 are separated by a thin layer 602 of Teflon-type material at the closed ends of the two holes that hold the probes 600. The thickness of the thin layer 602 is approximately in the range of one thousandth of an inch or 25 μm. An AC signal generator 610 sends an AC voltage signal with a frequency in a range from 1 MHZ to 100 MHZ to the probes 600. The electric current flowing through the probes 600 and the portion of the sample 100 between the two probes 600 is converted into voltage by a resistor 620. The voltage across the resistor 620 is then amplified by an amplifier 630. A rectifier 640 extracts the DC voltage signal from the output of the amplifier 630 and feeds it to the microprocessor 206 for further processing.

The microprocessor 206 performs several functions in the resistivity sensing sub-system. First, it controls the AC voltage and the frequency of the signal generated by the AC signal generator 610 to the two conducting probes 600. Secondly, it converts the analog signal from the rectifier 640 into digital form. Thirdly, it is programmed to automatically calculate the resistivity of the wafer 100 using the following parameters: (1) the wafer thickness value from the optical measurements, (2) the value of the AC voltage from the AC signal generator 510, (3) the measured DC voltage from the rectifier 640, and (4) the fixed distance between the two conducting probes 600 and the cross-section area of the parts on the probes 600 that are in contact with the layer 602. The impedance of the thin layers 602, which is small compared to that of the wafer sample 100, can be used for calibrating the measurements. Since the subsystem is preferably used at RF frequencies, the skin depth of the system allows resistance to be measured in this way.

As described above, an optical micrometer in accordance with the invention utilizes one or a plurality of optical beams to measure characteristics of a semiconductor wafer without destructive effects. Optical absorption and/or optical interference are employed to measure the absolute thickness and total thickness variation of a wafer sample. The present invention provides significant advantages over other measuring techniques in a number of aspects such as the ability to measure both absolute thickness and thickness variation, the capability to measure wafers with a wide range of thickness from sub-micron to 1000 μm, direct viewing and measuring processed micro-structures such as etched membranes, nondestructive probing with optical beams, user-insensitive operation, and high accuracy. Integrated with a novel radio-frequency probing system, an optical micrometer in accordance with the present invention is also capable of measuring another important parameter of a wafer sample, electric resistivity. The present invention provides user-friendly system interface for data processing and system monitoring using a microcontroller unit.

Utilization of the present invention may have significant impact on both technical and economic aspects of semiconductor manufacturing industry. This invention greatly facilitates research and development in new semiconductor wafer materials and devices. The present invention may also be used to increase the through put of wafer inspection prior to shipping, and to provide needed information on wafer quality for improving manufacturing and application implementation.

Although the present invention has been described in detail with reference to a number of particular embodiments, one ordinarily skilled in the art to which this invention pertains will appreciate that various modifications and enhancements may be made without departing from the spirit and scope of the claims that follow. For example, when lasers are used for the light source 104 for embodiments utilizing both light absorption and interference as illustrated in FIGS. 1–3, the positioning device for moving the light source 104 in and out of the path of the coherent beam for thickness variation measurements may be eliminated. This is because that optical components (e.g., a beam splitter) can be used to guide the beam from the light source 104 to a selected location on the wafer sample 100 and to the light detector 106 without interfering with the total thickness variation measuring process owing to the well-known directionality of a laser beam. Another example is that a viewing optics (e.g., an enlarging lens) can be inserted in front of the camera in the path of the reflected beam 113 for better viewing the interference fringes such as enlarging the image of an area of particular interest. All such modifications are intended to be encompassed in the following claims, in which:

What is claimed is:

1. A system for characterizing properties of a semiconductor wafer with electromagnetic radiation, comprising:

a first light source, operable to produce a first substantially monochromatic light beam at a first selected wavelength operating to illuminate a first surface of the wafer, at least a portion of said first light beam passing through said semiconductor wafer as a transmitted beam;

a first light receiver, located on the opposite side of the wafer relative to the first surface, receiving said transmitted light beam and measuring an intensity thereof;

an information processing device, communicating with said first light receiver, operable to produce thickness information of the wafer from said transmitted light beam according to an amount of light absorption by the wafer at said first selected wavelength;

a second light source for measuring a thickness variation of said semiconductor wafer, producing a coherent light beam to which the wafer is at least partially transparent, said coherent light beam being guided to impinge said wafer to produce a reflected coherent beam which embeds an interference pattern indicative of a thickness variation of said semiconductor wafer;

a second light receiver connected to and configured to communicate with said information processing device, operating to receive said reflected coherent beam and capture said interference pattern embedded therein, whereby said information processing device generates said thickness variation from said interference pattern in said reflected coherent beam and an absolute thickness measurement from light absorption of said first light beam.

2. A system as in claim 1, wherein said information processing device determines said thickness variation based on a phase change recorded in fringes of said interference pattern.

3. A system as in claim 1, wherein said information processing device has a first set of predetermined and calibrated data on light absorption and corresponding thickness of a first set of wafer standards at said first selected wavelength.

4. A system as in claim 3, wherein said first light source is operable to produce a second substantially monochromatic light beam at a second selected wavelength and said information processing device has a second set of predetermined and calibrated data on light absorption and corresponding thickness of a second set of wafer standards at said second selected wavelength.

5. A system as in claim 4, wherein said first and second sets of wafer standards have different ranges of wafer thickness.

6. A system as in claim 4, wherein said first selected wavelength is within the visible spectral range and said second selected wavelength is within the IR spectral range.

7. A system as in claim 3, wherein said first light beam is collimated and said first light receiver includes a light sensing array for capturing an image of a portion of the semiconductor wafer that is illuminated by said first light beam, said image imprinted in said transmitted beam and indicative of light absorption by said semiconductor wafer.

8. A system as in claim 7, further comprising a frame grabber connected to said information processing device and operable to digitize said image to obtain a wafer thickness map of said illuminated portion of said semiconductor wafer.

9. A system as in claim 7, further comprising a positioner for controlling a relative translational position between the wafer and said light sensing array in a plane substantially perpendicular to said first light beam.

10. A system as in claim 1, wherein said information processing device includes a display which displays results of light attenuation and light interference.

11. An optical micrometer, comprising:

a sampler holder, holding a semiconductor wafer to be measured;

an absorption module for measuring absolute thickness of said semiconductor wafer, disposed relative to said sample holder and having a monochromatic light source for producing a first light beam of a first wavelength at which said semiconductor wafer is absorptive, said absorption module operable to measure light absorption of said semiconductor wafer at said first wavelength with said first light beam; and a coherent optical module for measuring a relative thickness variation of said semiconductor wafer, disposed relative to said sample holder and having a coherent light source for producing a second light beam of a second wavelength at which said semiconductor wafer is at least partially transparent, said coherent optical module operable to produce an interference pattern between reflected beams from two surfaces of said wafer at said second wavelength by using said second light beam.

12. A device as in claim 11, wherein said coherent light source is a laser.

13. A device as in claim 12, wherein said laser is a diode laser or a diode-pumped solid-state laser.

14. A device as in claim 11, wherein said monochromatic light source is a laser, a light-emitting diode, or a white light source in combination with a narrow bandpass filter.

15. A device as in claim 11, further comprising an optical element disposed in the optical path of said second light beam and operable to expand and collimate said second light beam to illuminate an area on the semiconductor wafer and wherein said first light beam projects a first beam spot on said semiconductor wafer that is smaller than a second beam spot projected by said second light beam.

16. A device as in claim 11, further comprising a microcontroller, communicating with said absorption module and said coherent optical module, processing said interference pattern and said light absorption to determine an absolute thickness variation of said wafer by using predetermined calibration data of wafer thickness as a function of light absorption.

17. A device as in claim 16, wherein said calibration data is obtained by measuring absorption at a predetermined wavelength and thickness of a plurality of wafer standards in a selected range of thickness.

18. A device as in claim 11, wherein said absorption module performs a plurality of sampling measurements at a point on said wafer where said first light beam is aimed at, whereby said device checks a constancy of said sampling measurements to determine data validity.

19. A device as in claim 11, further comprising a temperature detector to determine whether said absorption module is operated within a predetermined temperature range.

20. A device as in claim 11, further comprising a resistivity-sensing module for measuring electric resistivity of said wafer by applying a RF signal across two metal probes located at two locations in a close proximity of said wafer.

21. A nondestructive method for measuring a thickness value of a semiconductor wafer, comprising:

obtaining a thickness variation profile of said wafer based on an interference pattern in a reflected beam of an incident collimated coherent beam on said wafer, said coherent beam being at a wavelength to which said wafer is at least partially transparent;

determining light attenuation at a selected point on said wafer illuminated by said coherent beam by measuring a transmitted power of a monochromatic probe beam at a selected wavelength with a known input power;

determining an absolute thickness of said wafer at said selected point based on said light attenuation at said selected wavelength; and determining absolute thickness values of all other points illuminated by said coherent beam according to relative positioning of said points in said interference pattern with respect to said selected point.

22. A method as in claim 21, wherein said determining an absolute thickness of said wafer at said selected point is based on a set of calibration data of wafer standards at said selected wavelength.

* * * * *